US009338355B2

(12) United States Patent
Watanabe

(10) Patent No.: US 9,338,355 B2
(45) Date of Patent: May 10, 2016

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventor: Takeshi Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/138,878

(22) Filed: Dec. 23, 2013

(65) Prior Publication Data
US 2014/0184836 A1 Jul. 3, 2014

(30) Foreign Application Priority Data

Dec. 27, 2012 (JP) ................. 2012-286171

(51) Int. Cl.
*H04N 5/232* (2006.01)

(52) U.S. Cl.
CPC ....... *H04N 5/23264* (2013.01); *H04N 5/23254* (2013.01); *H04N 5/23258* (2013.01); *H04N 5/23261* (2013.01); *H04N 5/23277* (2013.01); *H04N 5/23287* (2013.01)

(58) Field of Classification Search
CPC .......... H04N 5/23264; H04N 5/23254; H04N 5/23287; H04N 5/23261; H04N 5/23277; H04N 2/23258; H04N 5/2328; H04N 5/23267; H04N 5/23248; G02B 27/646; G03B 2217/005; G03B 2205/0015; G03B 2205/0007; G03B 5/00
See application file for complete search history.

(56) References Cited

U.S. PATENT DOCUMENTS

| 5,109,249 A | 4/1992 | Kitajima |
| 5,649,237 A | 7/1997 | Okazaki |
| 7,554,578 B2 | 6/2009 | Molgaard |
| 7,634,178 B2 | 12/2009 | Washisu |
| 7,907,205 B2 | 3/2011 | Okada |
| 8,023,809 B2 | 9/2011 | Washisu et al. |
| 8,400,516 B2 | 3/2013 | Yamada et al. |

(Continued)

FOREIGN PATENT DOCUMENTS

| JP | 2006-071743 A | 3/2006 |
| JP | 2009-124597 A | 6/2009 |

(Continued)

OTHER PUBLICATIONS

Masahiro Shibata, U.S. Appl. No. 14/138,843, filed Dec. 23, 2013.

*Primary Examiner* — Luong T Nguyen
(74) *Attorney, Agent, or Firm* — Carter, DeLuca, Farrell & Schmidt, LLP

(57) ABSTRACT

An image capturing apparatus includes an image capturing unit, a motion vector detection unit, a shake detection unit, a shake calculation unit configured to calculate a shake amount of the image capturing apparatus between the two images, an image blurring conversion unit configured to convert an output from the shake calculation unit into an image blurring amount of an image, a correction amount calculation unit configured to calculate, by using at least one of an output from the motion vector detection unit and an output from the image blurring conversion unit, a correction amount for electronically correcting the image blurring amount of the image, and a correction unit configured to electronically correct image blurring of the image based on an output from the correction amount calculation unit.

9 Claims, 11 Drawing Sheets

(56) References Cited

U.S. PATENT DOCUMENTS

| | | |
|---|---|---|
| 8,477,201 B2 | 7/2013 | Washisu |
| 8,605,159 B2 | 12/2013 | Nishiyama |
| 8,629,910 B2 * | 1/2014 | Miyasako ............... 348/208.4 |
| 8,803,983 B2 | 8/2014 | Miyazawa |
| 8,811,809 B2 | 8/2014 | Miyazawa |
| 8,873,942 B2 | 10/2014 | Wakamatsu |
| 2002/0051634 A1 | 5/2002 | Sato |
| 2004/0085464 A1 | 5/2004 | Higurashi et al. |
| 2009/0167911 A1 * | 7/2009 | Takane ..................... 348/296 |
| 2010/0013937 A1 | 1/2010 | Washisu et al. |
| 2010/0079604 A1 | 4/2010 | Washisu |
| 2010/0141799 A1 * | 6/2010 | Yamashita et al. ......... 348/239 |
| 2011/0013896 A1 | 1/2011 | Kawahara |
| 2011/0157381 A1 * | 6/2011 | Miyasako ............... 348/208.5 |
| 2012/0014681 A1 | 1/2012 | Miyahara et al. |
| 2012/0033092 A1 | 2/2012 | Sugaya |
| 2012/0033954 A1 * | 2/2012 | Wakamatsu ................ 396/55 |
| 2012/0092511 A1 | 4/2012 | Wakamatsu |
| 2012/0093493 A1 | 4/2012 | Wakamatsu |
| 2012/0293674 A1 | 11/2012 | Uenaka |
| 2013/0004150 A1 | 1/2013 | Wakamatsu |
| 2013/0162847 A1 | 6/2013 | Miyazawa |
| 2013/0163084 A1 | 6/2013 | Miyazawa |
| 2013/0163972 A1 | 6/2013 | Miyazawa |
| 2014/0063271 A1 | 3/2014 | Ogura et al. |
| 2014/0063272 A1 | 3/2014 | Tsuchida et al. |
| 2014/0063279 A1 | 3/2014 | Ogura et al. |
| 2014/0071303 A1 | 3/2014 | Hasegawa |
| 2014/0085494 A1 | 3/2014 | Tsuchiya et al. |
| 2014/0111658 A1 | 4/2014 | Watanabe et al. |
| 2014/0111659 A1 | 4/2014 | Miyasako et al. |
| 2014/0111661 A1 | 4/2014 | Watanabe et al. |
| 2014/0146191 A1 | 5/2014 | Tsuchiya et al. |
| 2014/0327789 A1 | 11/2014 | Tsuchiya et al. |

FOREIGN PATENT DOCUMENTS

| | | |
|---|---|---|
| JP | 2011-029735 A | 2/2011 |
| JP | 2011-146260 A | 7/2011 |

* cited by examiner

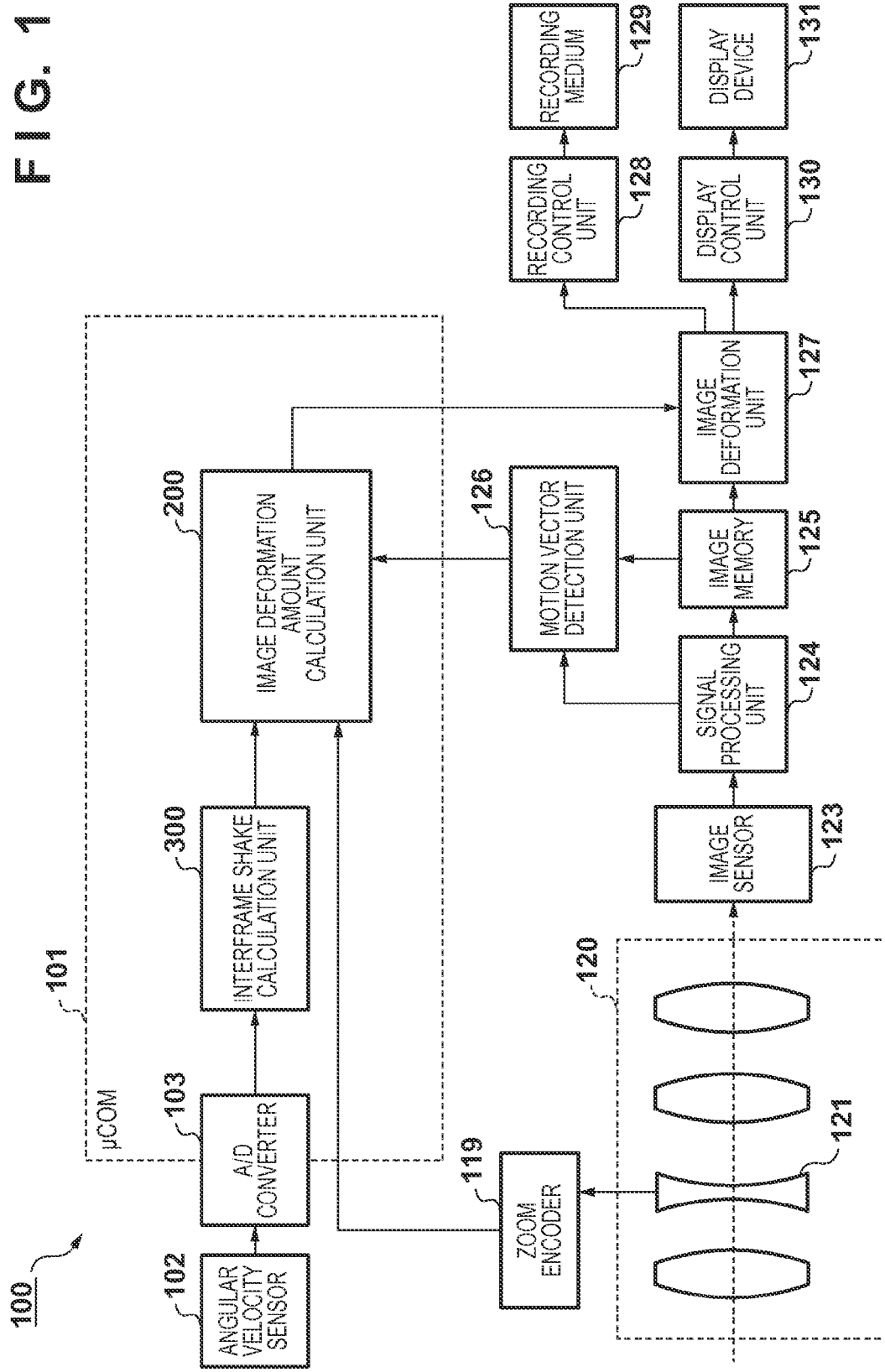

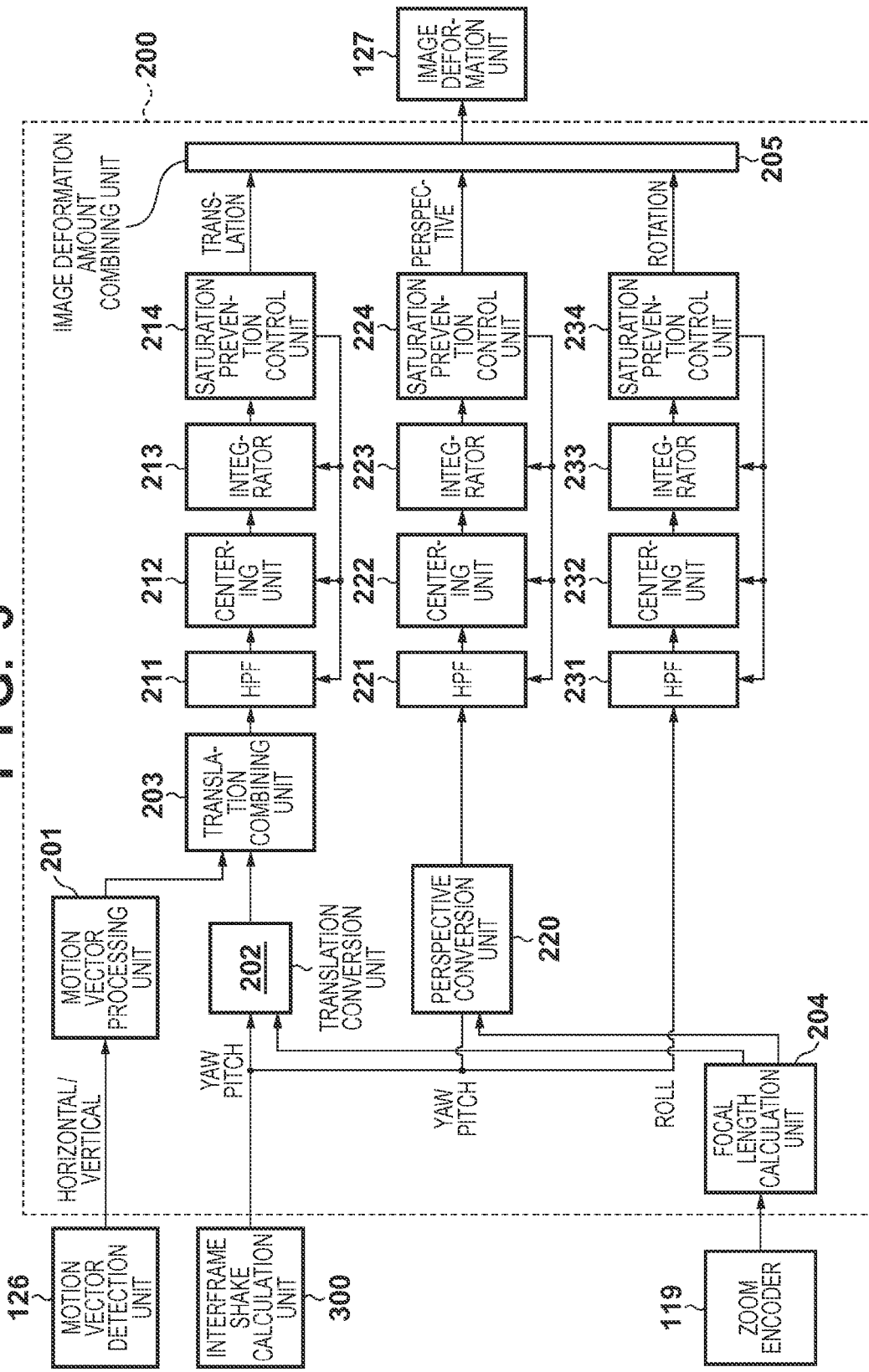

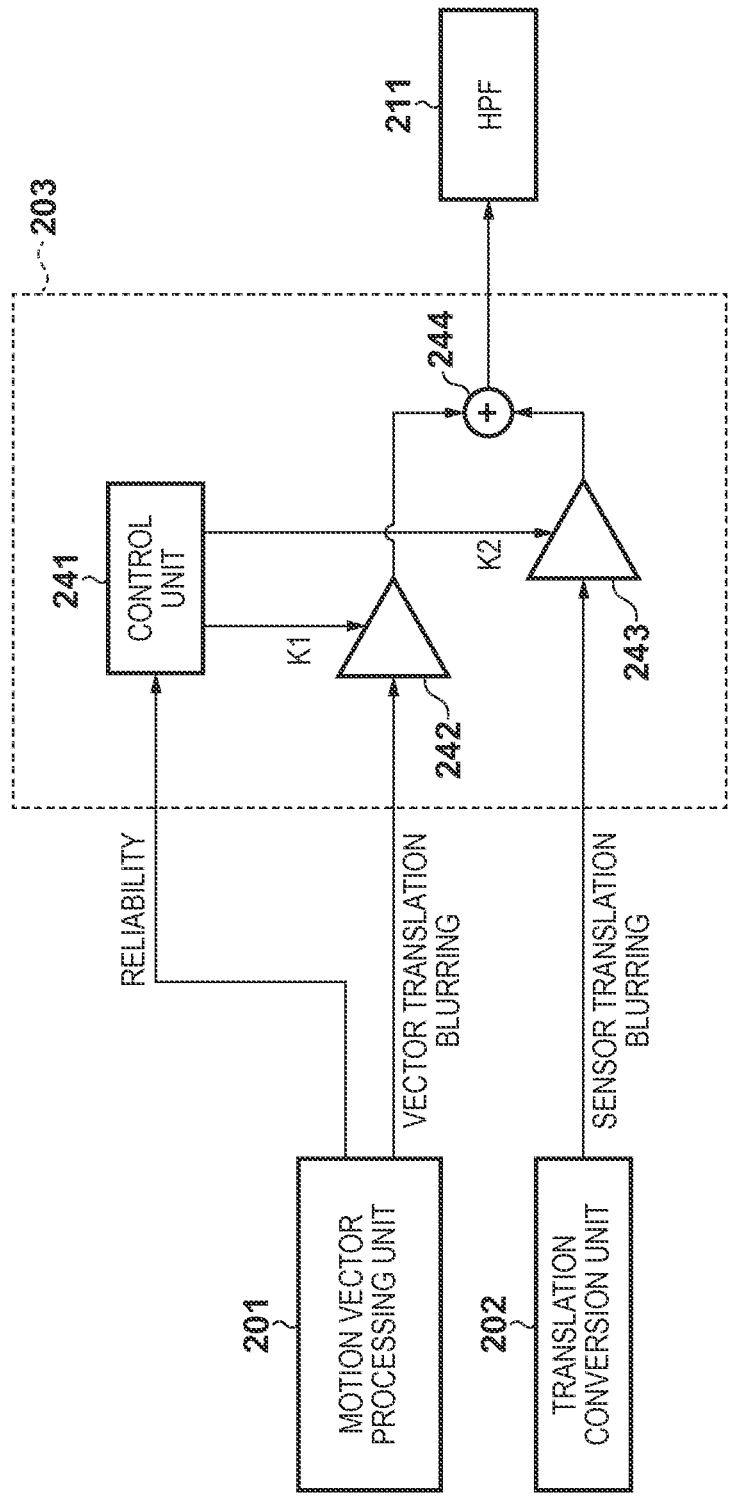

IMAGE CAPTURING APPARATUS, CONTROL METHOD THEREOF, AND STORAGE MEDIUM

BACKGROUND OF THE INVENTION

1. Field of the Invention

The present invention relates to a technique of correcting image blurring of a captured image arising from a shake of an image capturing apparatus by using a method of deforming an image in the image capturing apparatus.

2. Description of the Related Art

In recent years, an image stabilization function has become popular along with the development of a technique of correcting a shake acting on an image capturing apparatus. The image stabilization function corrects not only image blurring of a captured image caused by a camera shake when a user is in a still state, but also image blurring of a captured image generated in shooting while the user is walking. When the user shoots an image while walking, the following image blurring is generated in the captured image, in addition to image blurring of the captured image in the horizontal and vertical directions. Examples are image blurring in which a captured image rotates owing to rotation of the image capturing apparatus about the optical axis, and image blurring in which a captured image is distorted into a trapezoidal shape owing to a tilt of the image capturing apparatus with respect to an object.

As a method of correcting various kinds of image blurring generated in a captured image in shooting while walking, there is known a method of calculating the image deformation amount of a captured image and deforming the image to cancel the image deformation amount (see Japanese Patent Laid-Open No. 2011-146260). Also, as a method of calculating various image deformation amounts of a captured image, there is known a method of calculating an image deformation amount by using a motion vector obtained from a captured image, in addition to a sensor such as an angular velocity sensor (see Japanese Patent Laid-Open No. 2009-124597).

In the technique disclosed in Japanese Patent Laid-Open No. 2011-146260, the amount of deformation generated in a captured image owing to a shake acting on the image capturing apparatus is decomposed into deformation components of translation (horizontal/vertical), perspective (horizontal/vertical), enlargement/reduction, rotation, and shear. Filtering processing and the like are then performed for the respective deformation components, and a projective transformation matrix (homography matrix) is calculated. However, since filtering processing and the like are performed for each deformation component acting on the image capturing apparatus, the calculation amount becomes very large and processing becomes complicated.

In the technique disclosed in Japanese Patent Laid-Open No. 2009-124597, a correction amount for rotation is calculated using a sensor such as an angular velocity sensor, and a correction amount for translation is calculated using a motion vector. However, in a shooting situation in which no motion vector can be detected accurately, the detection accuracy of image blurring caused by translational motion drops, resulting in poor video quality. For example, the contrast of a captured image may become extremely low depending on an object. At this time, the detection accuracy of the motion vector may decrease.

SUMMARY OF THE INVENTION

The present invention has been made in consideration of the above problems, and provides an image capturing apparatus which can obtain a satisfactory image stabilization effect by a simple arrangement.

According to the first aspect of the present invention, there is provided an image capturing apparatus comprising: an image capturing unit configured to capture images; a motion vector detection unit configured to detect a motion vector between two images out of the images; a shake detection unit configured to detect a shake; a shake calculation unit configured to calculate a shake amount of the image capturing apparatus during shooting of the two images based on an output from the shake detection unit until an image of a succeeding frame out of the two images is captured after an image of a preceding frame out of the two images is captured; an image blurring conversion unit configured to convert an output from the shake detection unit into an image blurring amount of an image; a correction amount calculation unit configured to calculate, by using at least one of an output from the motion vector detection unit and an output from the image blurring conversion unit, a correction amount for electronically correcting the image blurring amount of an image; and a correction unit configured to electronically correct image blurring of the image based on an output from the correction amount calculation unit.

According to the second aspect of the present invention, there is provided a method of controlling an image capturing apparatus including an image capturing unit configured to capture images, comprising: a motion vector detection step of detecting a motion vector between two images out of the images; a shake detection step of detecting a shake; a shake calculation step of calculating a shake amount of the image capturing apparatus between the two images based on an output in the shake detection step until an image of a succeeding frame out of the two images is captured after an image of a preceding frame out of the two images is captured; an image blurring conversion step of converting an output in the shake calculation step into an image blurring amount of an image; a correction amount calculation step of calculating, by using at least one of an output in the motion vector detection step and an output in the image blurring conversion step, a correction amount for electronically correcting the image blurring amount of the image; and a correction step of electronically correcting image blurring of the image based on an output in the correction amount calculation step.

Further features of the present invention will become apparent from the following description of exemplary embodiments with reference to the attached drawings.

BRIEF DESCRIPTION OF THE DRAWINGS

FIG. 1 is a block diagram showing an example of the arrangement of a video camera as an example of an image capturing apparatus according to the first embodiment of the present invention;

FIG. 3 is a block diagram showing the arrangement of an image deformation amount calculation unit in the first embodiment;

FIG. 6 is a block diagram showing the arrangement of a translation combining unit in the first embodiment;

DESCRIPTION OF THE EMBODIMENTS

Embodiments of the present invention will now be described in detail with reference to the accompanying drawings.

Figure 11A:
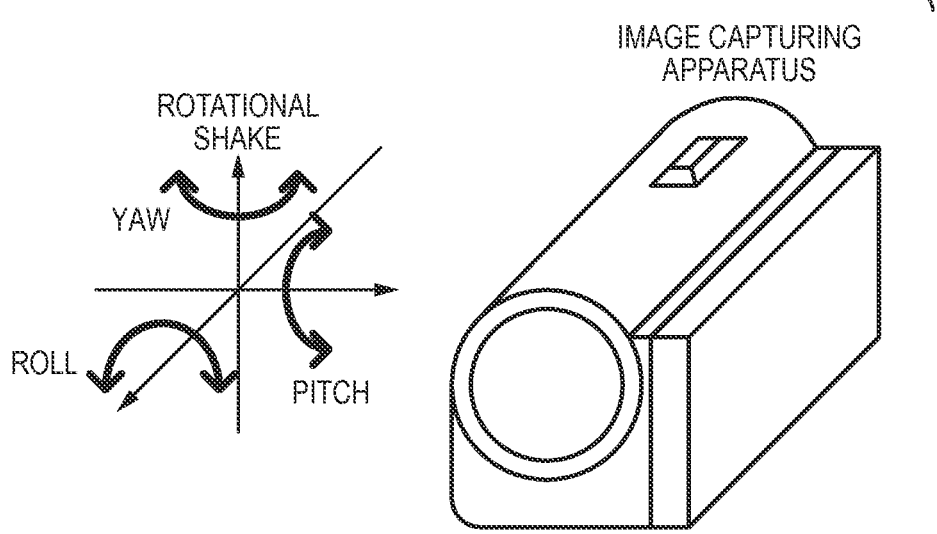
FIGS. 11A and 11B are views for explaining the definition of "shake" in the embodiments of the present invention.
Figure 11B:
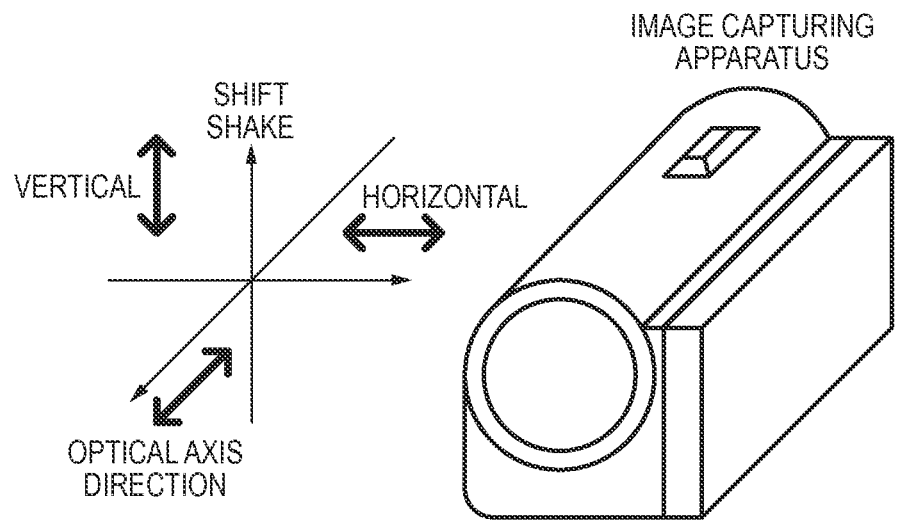
Figure 12A:
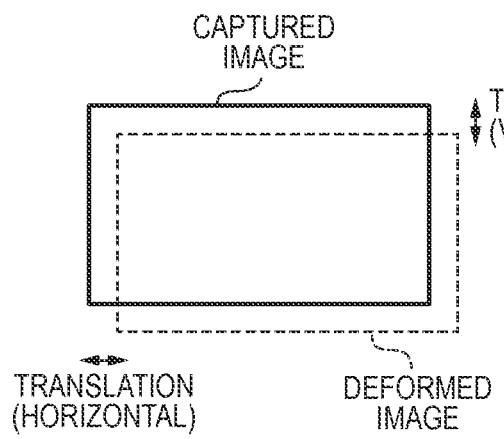
FIGS. 12A to 12F are views for explaining the definition of "image blurring" in the embodiments of the present invention.
Figure 12B:
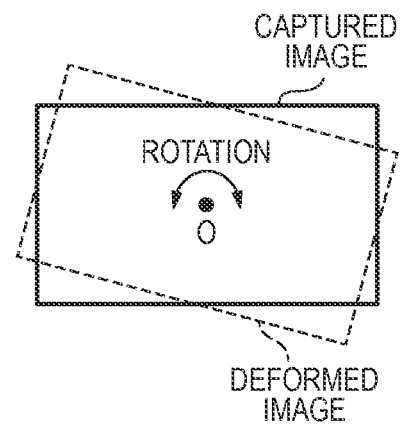
Figure 12C:
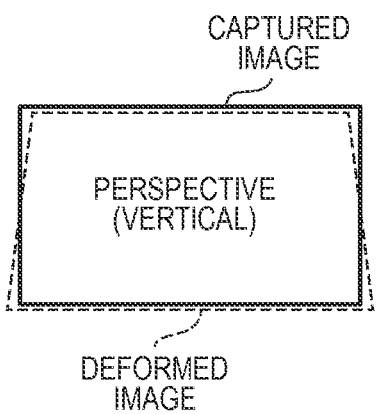
Figure 12D:
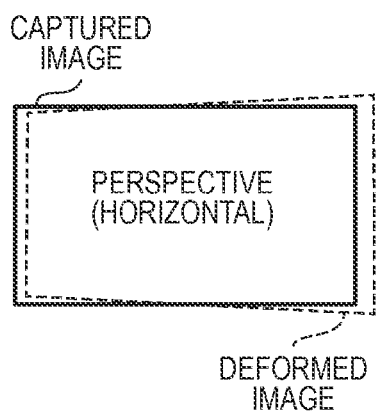
Figure 12E:
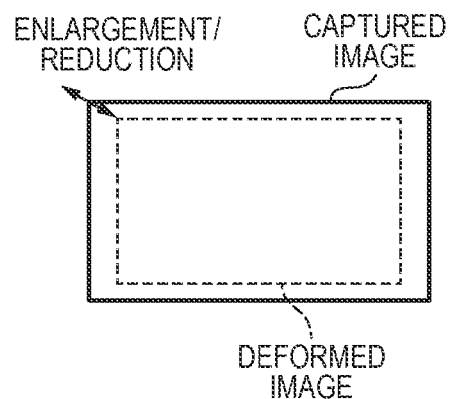
Figure 12F:
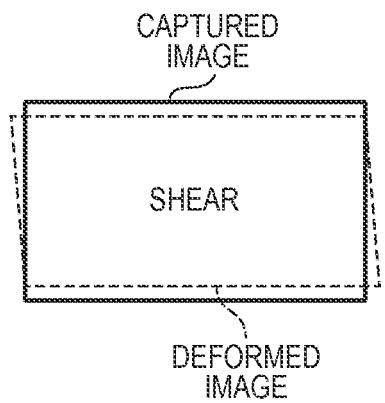

First, the definitions of terms used in the embodiments of the present invention will be explained. In the description of the embodiments of the present invention, "shake" is movement acting on an image capturing apparatus, and "image blurring" is deformation of a captured image caused by a shake acting on the image capturing apparatus. In the embodiments of the present invention, "shake" generically means three "rotational shakes" in the yaw, pitch, and roll directions, and three "translational shakes" (shift shakes) in the horizontal, vertical, and optical axis directions parallel to axes (horizontal, vertical, and optical axes) perpendicular to each other, as shown in FIGS. 11A and 11B. Note that the yaw direction is a direction around the vertical axis. The pitch direction is a direction around the horizontal axis. The roll direction is a direction around the optical axis. On the other hand, "image blurring" generically means deformation components of translation (horizontal/vertical), rotation, perspective (horizontal/vertical), enlargement/reduction, and shear, as shown in FIGS. 12A to 12F.

First Embodiment

FIG. 1 is a block diagram showing the arrangement of a video camera as an example of an image capturing apparatus according to the first embodiment of the present invention. The building components of an image capturing apparatus 100 shown in FIG. 1 and an example of its operation will be described in detail below.

An angular velocity sensor 102 detects a shake acting on the image capturing apparatus 100 as an angular velocity signal, and supplies the angular velocity signal to an A/D converter 103. The A/D converter 103 converts the angular velocity signal from the angular velocity sensor 102 into a digital signal, and supplies it as angular velocity data to an interframe shake calculation unit 300 (image blurring conversion unit) in a μCOM 101. The interframe shake calculation unit 300 calculates an amount of rotational shake acting on the image capturing apparatus between sequentially captured frames of a moving image, and supplies it as angle data to an image deformation amount calculation unit 200 (correction amount calculation unit) which calculates a deformation amount for electronically correcting image blurring of an image. Details of processing by the interframe shake calculation unit 300 will be described later.

An imaging optical system 120 performs an operation such as zooming by movement of a zoom lens or focusing by movement of a focus lens, and forms an object image on an image sensor 123. A zoom encoder 119 serving as a focal length detection means detects the position (zoom position) of a zoom optical system 121 in the imaging optical system 120, and outputs it to the image deformation amount calculation unit 200 in the μCOM 101.

The image sensor 123 converts the object image formed by the imaging optical system 120 into an electrical signal serving as a captured image signal, and supplies it to a signal processing unit 124. The signal processing unit 124 generates a video signal complying with, for example, the NTSC format from the signal obtained by the image sensor 123, and supplies it to an image memory 125. A motion vector detection unit 126 detects the motion vector of an image based on two captured images serving as temporally preceding and succeeding frames, more specifically, a luminance signal contained in a current video signal generated by the signal processing unit 124 and a luminance signal contained in a video signal of an immediately preceding frame stored in the image memory 125. The motion vector data detected by the motion vector detection unit 126 is supplied to the image deformation amount calculation unit 200.

The image deformation amount calculation unit 200 calculates an image deformation amount for correcting image blurring of a captured image by using the above-mentioned angle data and motion vector data, and an output from the zoom encoder 119, and sets the calculated image deformation amount in an image deformation unit 127. Details of processing by the image deformation amount calculation unit 200 will be described later.

The image deformation unit 127 corrects image blurring of the captured image by deforming the image stored in the image memory 125 based on the image deformation amount calculated by the image deformation amount calculation unit 200, and outputs the corrected image to a recording control unit 128 and a display control unit 130. The display control unit 130 outputs the video signal supplied from the image deformation unit 127 and causes a display device 131 to display the image. The display control unit 130 drives the display device 131. The display device 131 displays the image by a liquid crystal display element (LCD or viewfinder) or the like.

If recording of a video signal is designated via an operation unit (not shown) used to instruct the start or end of recording, the recording control unit 128 outputs a video signal supplied from the image deformation unit 127 to a recording medium 129, and records it on the recording medium 129. The recording medium 129 is an information recording medium such as a semiconductor memory, or a magnetic recording medium such as a hard disk or magnetic tape.

Image deformation to be performed by the image deformation unit 127 will be explained in detail.

The image deformation unit 127 performs image deformation using geometric transformation such as projective transformation. More specifically, (X0, Y0) are pixel coordinates in an image before deformation (an image stored in the image memory 125) (note that the center of the captured image corresponding to the optical axis of the imaging optical system 120 is set as the origin). (X1, Y1) are pixel coordinates in an image (an output image from the image deformation unit 127) after deformation. In this case, image deformation can be represented by a homogeneous coordinate system, as given by:

$$\begin{bmatrix} X1 \\ Y1 \\ 1 \end{bmatrix} \sim \begin{bmatrix} h1 & h2 & h3 \\ h4 & h5 & h6 \\ h7 & h8 & 1 \end{bmatrix} \begin{bmatrix} X0 \\ Y0 \\ 1 \end{bmatrix} \quad (1)$$

The left and right sides of expression (1) have an equivalence relation (even if the left or right side is multiplied by an arbitrary magnification, the meaning remains unchanged). If the normal equal sign is used, expression (1) is rewritten into:

$$X1 = \frac{h1X0 + h2Y0 + h3}{h7X0 + h8Y0 + 1} \quad (2)$$

$$Y1 = \frac{h4X0 + h5Y0 + h6}{h7X0 + h8Y0 + 1} \quad (3)$$

In expression (1), the 3×3 matrix is generally called a projective transformation matrix. The image deformation amount calculation unit 200 sets elements h1 to h8 of the matrix. In the following description, the image deformation unit 127 performs image deformation by using projective transformation. However, any deformation method such as affine transformation may be used.

Next, details of processing to be performed by the image deformation amount calculation unit 200 will be described. The image deformation amount calculation unit 200 calculates the image deformation amount of the image deformation unit 127 by using a shake angle of the image capturing apparatus calculated from an output from the angular velocity sensor 102, and a focal length of the imaging optical system 120 calculated by the zoom encoder 119. More specifically, the projective transformation matrix in expression (1) is calculated.

A method of calculating the projective transformation matrix using the shake angle and the focal length of the imaging optical system 120 will be described below.

Figure 2A:
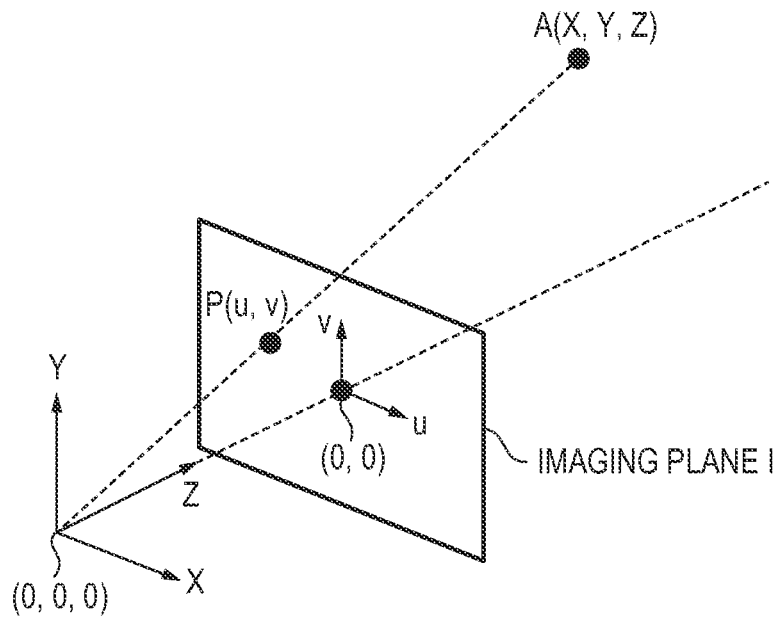
FIGS. 2A and 2B are views for explaining a pinhole camera model.

FIG. 2A shows projection of an object image on an imaging plane by the image capturing apparatus by using a pinhole camera model. Referring to FIG. 2A, the origin (0, 0, 0) of the XYZ space coordinate system corresponds to a pinhole position in the pinhole camera model. If the imaging plane is arranged behind the pinhole position, an image projected on the imaging plane is inverted. In FIG. 2A, therefore, an imaging plane I is virtually arranged in front of the pinhole position so that the image is not inverted and is thus easily handled.

The distance in the Z-axis direction between the origin (0, 0, 0) of the XYZ space coordinate system and the imaging plane I is a focal length f. Coordinates on the imaging plane I are defined as uv plane coordinates. Assume that the origin (0, 0) of the uv plane coordinate system coincides with (0, 0, f) in the XYZ space coordinate system. A coordinate point P(u, v) in the uv plane coordinate system represents a coordinate point obtained when an object position A(X, Y, Z) in the XYZ space coordinate system is projected on the imaging plane I. At this time, the coordinate point P is given by:

$$\begin{bmatrix} u \\ v \end{bmatrix} = \begin{bmatrix} f\frac{X}{Z} \\ f\frac{Y}{Z} \end{bmatrix} \quad (4)$$

Using a homogeneous coordinate system, equation (4) can be rewritten into:

$$\begin{bmatrix} u \\ v \\ 1 \end{bmatrix} \sim \begin{bmatrix} f & 0 & 0 & 0 \\ 0 & f & 0 & 0 \\ 0 & 0 & 1 & 0 \end{bmatrix} \begin{bmatrix} X \\ Y \\ Z \\ 1 \end{bmatrix} \quad (5)$$

Elements in the fourth column of the 3×4 matrix in expression (5) remain 0 in the description of this embodiment, and thus expression (5) reduces to:

$$\begin{bmatrix} u \\ v \\ 1 \end{bmatrix} \sim \begin{bmatrix} f & 0 & 0 \\ 0 & f & 0 \\ 0 & 0 & 1 \end{bmatrix} \begin{bmatrix} X \\ Y \\ Z \end{bmatrix} \quad (6)$$

Figure 2B:
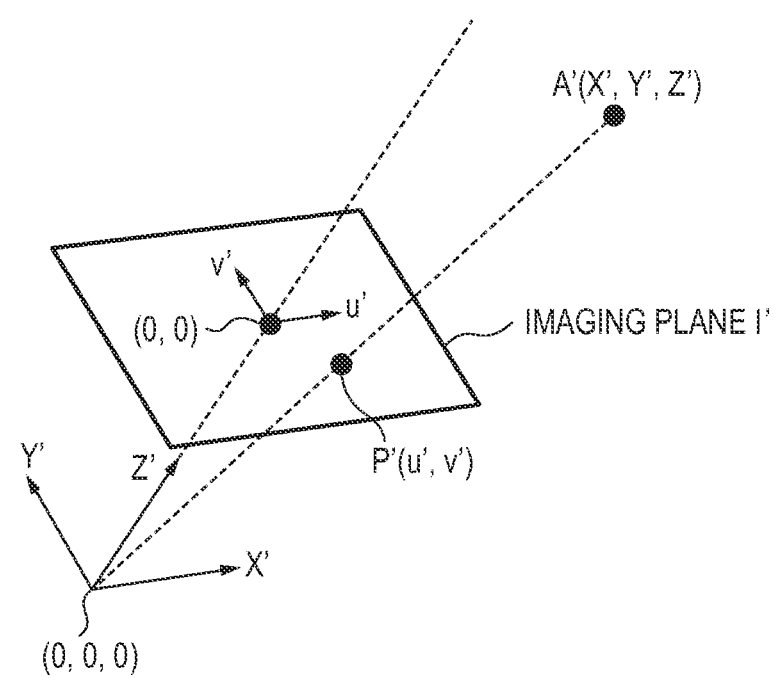

FIG. 2B shows a pinhole camera model obtained by rotating the pinhole camera model shown in FIG. 2A by R (a rotational shake R acts on the image capturing apparatus, and a translational shake, which is parallel movement of the image capturing apparatus, is not generated). FIG. 2B shows an X'Y'Z' space coordinate system obtained by rotating the XYZ space coordinate system shown in FIG. 2A by R. Assume that the origin (0, 0, 0) of the X'Y'Z' space coordinate system coincides with that of the XYZ space coordinate system. That is, FIG. 2B simply shows, by using a pinhole camera mode, a state in which the rotational shake R is generated, but a translational shake, which is parallel movement of the image capturing apparatus, is not generated in the image capturing apparatus.

In the pinhole camera model of FIG. 2B, an imaging plane I' is arranged at a distance of the focal length f from the origin (0, 0, 0), as in FIG. 2A. Coordinates on the imaging plane I' are defined as u'v' plane coordinates. Assume that the origin (0, 0) of the u'v' plane coordinate system coincides with (0, 0, f) in the X'Y'Z' space coordinate system. A coordinate point P'(u', v') in the u'v' plane coordinate system represents a coordinate point obtained when an object position A'(X', Y', Z') in the X'Y'Z' space coordinate system is projected on the imaging plane I'. Note that the object A in FIG. 2A and the object A' in FIG. 2B are at the same position in the world coordinate system (that is, the object stays still). Like expression (6), using the homogeneous coordinate system, the coordinate point P' is given by:

$$\begin{bmatrix} u' \\ v' \\ 1 \end{bmatrix} \sim \begin{bmatrix} f & 0 & 0 \\ 0 & f & 0 \\ 0 & 0 & 1 \end{bmatrix} \begin{bmatrix} X' \\ Y' \\ Z' \end{bmatrix} \quad (7)$$

The objects A and A' are at the same position in the world coordinate system, and thus the relationship between the coordinate points of the objects A and A' is given by:

$$\begin{bmatrix} X' \\ Y' \\ Z' \end{bmatrix} = R \begin{bmatrix} X \\ Y \\ Z \end{bmatrix} \quad (8)$$

Modification of expressions (6) and (7), and substitution of them into equation (8) yield:

$$\begin{bmatrix} u' \\ v' \\ 1 \end{bmatrix} \sim \begin{bmatrix} f & 0 & 0 \\ 0 & f & 0 \\ 0 & 0 & 1 \end{bmatrix} R \begin{bmatrix} f & 0 & 0 \\ 0 & f & 0 \\ 0 & 0 & 1 \end{bmatrix}^{-1} \begin{bmatrix} u \\ v \\ 1 \end{bmatrix} \quad (9)$$

Expression (9) indicates the correspondence between the positions of the object images on the imaging plane before and after the pinhole camera is rotated by R (a rotational shake R acts on the image capturing apparatus, and a translational shake, which is parallel movement of the image capturing apparatus, is not generated). That is, expression (9) represents the movement of the position of a pixel on the imaging plane when a shake of rotation by R acts on the image capturing apparatus. Therefore, to correct image blurring, it is only necessary to perform conversion to cancel the pixel movement amount when a shake acts on the image capturing apparatus. That is, it is only necessary to perform conversion to return, to the original position, a pixel position which has moved when a shake of rotation by R acts on the image capturing apparatus, given by:

$$\begin{bmatrix} u \\ v \\ 1 \end{bmatrix} \sim \begin{bmatrix} f & 0 & 0 \\ 0 & f & 0 \\ 0 & 0 & 1 \end{bmatrix} R^{-1} \begin{bmatrix} f & 0 & 0 \\ 0 & f & 0 \\ 0 & 0 & 1 \end{bmatrix}^{-1} \begin{bmatrix} u' \\ v' \\ 1 \end{bmatrix} \quad (10)$$

Let R be a shake acting on the image capturing apparatus 100 shown in FIG. 1, f be the focal length of the imaging optical system 120, and H be the projective transformation matrix for image stabilization. Then, H is given by:

$$H = \begin{bmatrix} f & 0 & 0 \\ 0 & f & 0 \\ 0 & 0 & 1 \end{bmatrix} R^{-1} \begin{bmatrix} f & 0 & 0 \\ 0 & f & 0 \\ 0 & 0 & 1 \end{bmatrix}^{-1} \quad (11)$$

Note that $\theta_y$ is a rotational shake amount acting on the image capturing apparatus in the yaw direction, which is a shake in the first direction on a plane perpendicular to the optical axis. $\theta_p$ is a rotational shake amount in the pitch direction, which is a shake in the second direction perpendicular to the first direction on the plane perpendicular to the optical axis. $\theta_r$ is a rotational shake amount in the roll direction. In this case, R is given by:

$$R = \begin{bmatrix} \cos\theta_y & 0 & -\sin\theta_y \\ 0 & 1 & 0 \\ \sin\theta_y & 0 & \cos\theta_y \end{bmatrix} \begin{bmatrix} 1 & 0 & 0 \\ 0 & \cos\theta_p & -\sin\theta_p \\ 0 & \sin\theta_p & \cos\theta_p \end{bmatrix} \begin{bmatrix} \cos\theta_r & -\sin\theta_r & 0 \\ \sin\theta_r & \cos\theta_r & 0 \\ 0 & 0 & 1 \end{bmatrix} \quad (12)$$

H of equation (11) can be decomposed into deformation components of translation $\vec{t}$, enlargement/reduction s (constant), rotation r (matrix), shear k (matrix), perspective $\vec{v}$ by using:

$$H = \begin{bmatrix} sr & \vec{t} \\ \vec{0}^t & 1 \end{bmatrix} \begin{bmatrix} k & \vec{0} \\ \vec{0}^t & 1 \end{bmatrix} \begin{bmatrix} I & \vec{0} \\ \vec{v}^t & 1 \end{bmatrix} \quad (13)$$

$$r = \begin{bmatrix} \cos\theta & -\sin\theta \\ \sin\theta & \cos\theta \end{bmatrix},$$

$$\vec{t} = \begin{bmatrix} t_x \\ t_y \end{bmatrix},$$

$$k = \begin{bmatrix} \alpha & \tan\phi \\ 0 & 1 \end{bmatrix},$$

$$\vec{v} = \begin{bmatrix} v_x \\ v_y \end{bmatrix},$$

$$I = \begin{bmatrix} 1 & 0 \\ 0 & 1 \end{bmatrix},$$

$$\vec{0} = \begin{bmatrix} 0 \\ 0 \end{bmatrix}$$

where
tx . . . horizontal translation amount
ty . . . vertical translation amount
θ . . . rotation angle
vx . . . horizontal perspective amount
vy . . . vertical perspective amount
α . . . anisotropic magnification of shear
φ . . . directional angle of shear Solving the equation of each deformation component using equations (11), (12), and (13) yields:

$$t_x = f(\tan\theta_y \cos\theta_r/\cos\theta_p + \tan\theta_p \sin\theta_r) \quad (14)$$

$$t_y = f(-\tan\theta_y \sin\theta_r/\cos\theta_p + \tan\theta_p \cos\theta_r) \quad (15)$$

$$\theta = -\theta_r \quad (16)$$

$$v_x = -\tan\theta_y/f \quad (17)$$

$$v_y = -\tan\theta_p/(f\cos\theta_y) \quad (18)$$

$$s = (\cos\theta_y \cos\theta_p)^{-3/2} \quad (19)$$

$$\alpha = (\cos\theta_p/\cos\theta_y)^{1/2} \quad (20)$$

$$\tan\phi = \sin\theta_y \sin\theta_p/(\cos\theta_y \cos\theta_p)^{1/2} \quad (21)$$

In this embodiment, as will be described later, processing by the image deformation amount calculation unit 200 simplifies calculation. A rotational shake acting on the image capturing apparatus does not become so large, except for a motion of intentionally operating the image capturing apparatus by a user, such as panning. Hence, when γ represents the angle of a shake acting on the image capturing apparatus, if its value is not so large, cos γ=1, sin γ tan γ=0, and sin γ sin γ=0 are obtained by approximation. In this case, equations (14) to (21) can be approximated by:

$$t_x = f\tan\theta_y \quad (22)$$

$$t_y = f\tan\theta_p \quad (23)$$

$$\theta = -\theta_r \quad (24)$$

$$v_x = -\tan\theta_y/f \quad (25)$$

$$v_y = -\tan\theta_p/f \quad (26)$$

$$s = 1 \quad (27)$$

$$\alpha = 1 \quad (28)$$

$$\tan\phi = 0 \quad (29)$$

At this time, the magnification of enlargement/reduction is 1 according to equation (27). The anisotropic magnification of shear is 1 and the directional angle is 0 according to equations (28) and (29). This reveals that, among deformation components generated in a captured image owing to a rotational shake acting on the image capturing apparatus, enlargement/reduction and shear are smaller than the remaining deformation components.

For this reason, in processing by the image deformation amount calculation unit 200 according to this embodiment, the enlargement/reduction and shear deformation components are not corrected, and only translation, rotation, and perspective are corrected.

Figure 4:
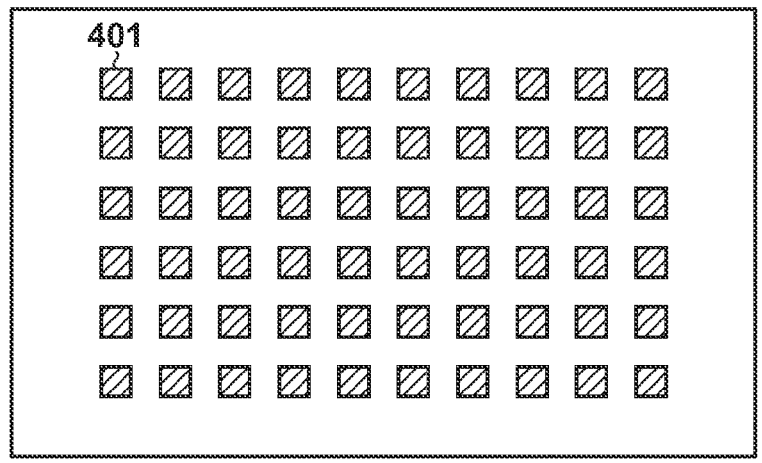
FIG. 4 is a view for explaining a motion vector detection unit in the first embodiment.

The building components of the image deformation amount calculation unit 200 and interframe shake calculation unit 300, and an example of their operations in this embodiment will be described in detail below with reference to the block diagrams of FIGS. 3 and 4.

First, blocks for calculating the motion vector of a captured moving image will be explained. In the block diagram of FIG. 3, the motion vector detection unit 126 detects a local motion vector between frame images. As local motion vector detection positions, for example, detection blocks 401 are arranged in a matrix of 6 blocks×10 blocks, as shown in FIG. 4. A local motion vector is detected in each detection block 401. Calculation of a motion vector can use a known method such as template matching or a gradient method, and a detailed description thereof will be omitted.

Local motion vectors detected in the respective blocks are supplied to a motion vector processing unit 201, and the motion vector processing unit 201 decides a typical vector serving as the motion vector value of the entire screen. More specifically, the median or average of local motion vector values is adopted as the typical vector value of the entire image.

At this time, the motion vector processing unit 201 obtains the reliability (scale of accuracy) of the typical motion vector value. More specifically, the motion vector processing unit 201 obtains the variance of local motion vector values, and decides the reliability of the typical motion vector value based on the variance. When the variance is small (that is, local motion vectors are not dispersed), the motion vector processing unit 201 determines that the reliability of the typical motion vector value is high. To the contrary, when the variance is large (that is, local motion vectors are dispersed), the motion vector processing unit 201 determines that the reliability of the typical motion vector value is low. This is because, when the motion directions of video signals are uniform, the local motion vector values of the respective blocks obtained from this image exhibit a uniform vector amount. In the motion vector processing unit 201, a reference value (reference value of the variance of local motion vector values) serving as a reliability determination criterion is set in advance. The reliability determination result and typical motion vector value obtained by the motion vector processing unit 201 are supplied to a translation combining unit 203. Although the calculation method based on the variance of local motion vectors has been exemplified for evaluation of the reliability of a motion vector, any method is usable as long as the reliability of a motion vector can be evaluated.

Next, blocks for processing an output signal from the angular velocity sensor will be explained. Note that a rotational shake in the yaw direction causes a horizontal translation and horizontal perspective in accordance with equations (22) and (25). A rotational shake in the pitch direction causes a vertical translation and vertical perspective in accordance with equations (23) and (26). However, processes in these two directions are the same, so only control in one of the directions will be explained.

Figure 5A:
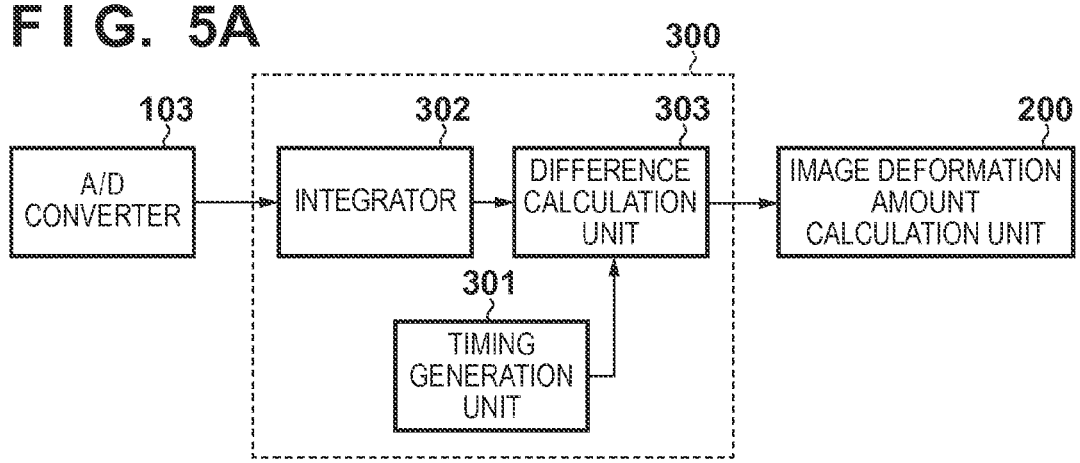
FIGS. 5A and 5B are block diagrams each showing the arrangement of an interframe shake calculation unit in the first embodiment.
Figure 5B:
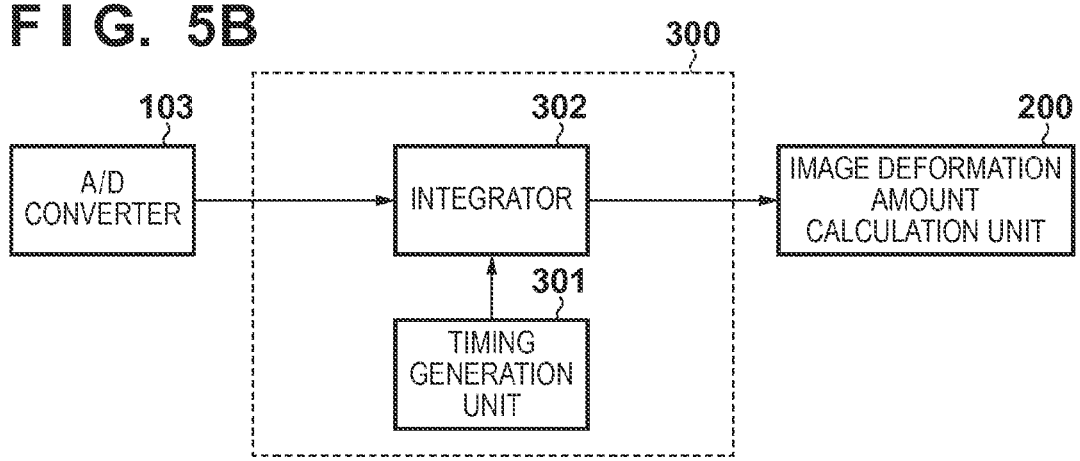

FIGS. 5A and 5B are block diagrams for explaining the arrangement of the interframe shake calculation unit 300. In the block diagram of FIG. 5A, an integrator 302 integrates angular velocity data supplied from the A/D converter 103. Then, the integrator 302 outputs angle data serving as the integration result of the angular velocity data. A timing generation unit 301 outputs, to a difference calculation unit 303, a signal synchronized with a timing to capture a frame image forming a moving image. Upon receiving the signal from the timing generation unit 301, the difference calculation unit 303 holds output data from the integrator 302. The difference calculation unit 303 then outputs a difference from a previously held value, that is, a rotational shake amount of the image capturing apparatus till the time when the current frame image was captured after the time when the previous frame image was captured.

FIG. 5B shows another example of the interframe shake calculation unit 300. More specifically, it is also possible to directly supply a signal output from the timing generation unit 301 to the integrator 302, reset an integrated value, and acquire a rotational shake amount between frames.

In this manner, the interframe shake calculation unit 300 calculates a rotational shake amount of the image capturing apparatus till the time when the current frame image was captured after the time when the previous frame image was captured, and supplies the rotational shake amount to the image deformation amount calculation unit 200.

In the block diagram of FIG. 3, the rotational shake amount between frames serving as an output from the interframe shake calculation unit 300 is supplied to a translation conversion unit 202. The translation conversion unit 202 converts the rotational shake amount between frames into a translation image blurring amount in an image. More specifically, the translation conversion unit 202 multiplies, by the focal length f of the imaging optical system 120 supplied from a focal length calculation unit 204, a rotational shake amount between preceding and succeeding frames serving as an output from the interframe shake calculation unit 300, thereby converting the rotational shake amount into a translation image blurring amount in an image that is generated between these frames. The calculation method of multiplication by the focal length f is performed according to translation calculation equations (22) and (23). The focal length calculation unit 204 can calculate the focal length f of the imaging optical system 120 from an output from the zoom encoder 119.

A typical motion vector serving as an output from the motion vector processing unit 201 is a translation image blurring amount itself on the screen between frames. Therefore, by calculating a rotational shake amount between frames from an output from the angular velocity sensor, as described above, a translation image blurring amount obtained from the angular velocity sensor and a motion vector supplied from the motion vector detection unit 126 can be handled as time-series data in the same unit on the same time axis. To discriminate a translation image blurring amount obtained from the angular velocity sensor from a translation image blurring amount obtained from the motion vector, the former will be called sensor translation image blurring, and the latter will be called vector translation image blurring, for convenience.

The translation combining unit 203 receives the sensor translation image blurring serving as an output from the translation conversion unit 202, and the typical motion vector (vector translation image blurring) and its reliability serving as an output from the motion vector processing unit 201. Based on them, the translation combining unit 203 obtains translation image blurring data to be finally used to calculate a correction amount.

FIG. 6 is a block diagram for explaining the detailed operation of the translation combining unit 203. A multiplier 242 receives the vector translation image blurring data supplied from the motion vector processing unit 201, and multiplies it by a predetermined magnification. A multiplier 243 receives the sensor translation image blurring data supplied from the translation conversion unit 202, and multiplies it by a predetermined magnification. An adder 244 adds an output from the multiplier 242 and an output from the multiplier 243 at a ratio based on the aforementioned magnifications, and outputs the sum as translation image blurring data to be finally used to calculate a correction amount. A control unit 241 receives the reliability of the typical motion vector serving as an output from the motion vector processing unit 201, and sets the magnifications of the multipliers 242 and 243 in accordance with the reliability. Letting K1 be a magnification set in the multiplier 242 and K2 be a magnification set in the multiplier 243, K1 and K2 are set to have values which satisfy the following equations:

$$0 \le K1 \le 1 \quad (30)$$

$$0 \le K2 \le 1 \quad (31)$$

$$(K1+K2)=1 \quad (32)$$

Figure 7:
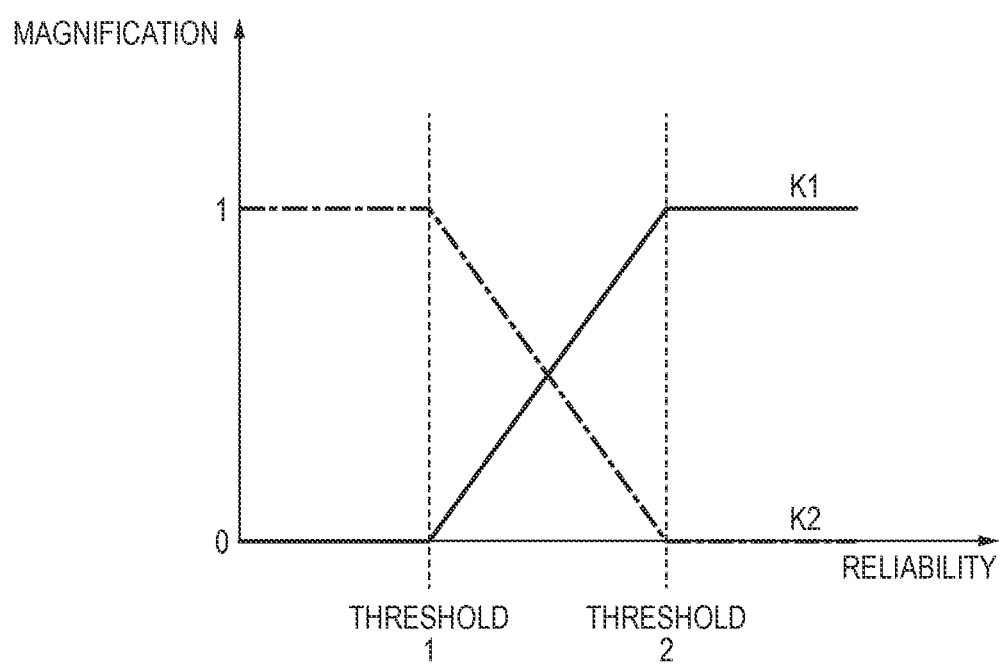
FIG. 7 is a graph for explaining the operation of the translation combining unit in the first embodiment.

FIG. 7 is a graph showing the characteristics of K1 and K2 decided in the control unit 241. When the reliability is lower than threshold 1, the magnifications are set to satisfy K1<K2. When the reliability falls between threshold 1 and threshold 2, K1 is set to become larger (K2 becomes smaller) as the reliability becomes higher. When the reliability is higher than threshold 2, the magnifications are set to satisfy K1>K2. In this way, when the reliability of a motion vector is high, the ratio of a translation image blurring amount obtained from the motion vector is increased. In contrast, when the reliability of a motion vector is low, the ratio of translation image blurring data obtained from the motion vector is decreased, and the ratio of translation image blurring data obtained from the angular velocity sensor is increased instead.

Referring back to FIG. 3, blocks 211 to 214 used to calculate the correction amount of translation image blurring will be explained. Among outputs from the above-described translation combining unit 203, translation image blurring data in the yaw or pitch direction is supplied to the HPF 211. The HPF 211 has a function capable of changing its characteristic in an arbitrary frequency band. The HPF 211 outputs a signal in a high frequency band by cutting off low frequency components contained in the translation image blurring. Note that the HPF 211 is not essential in this embodiment, and an output from the translation combining unit 203 may be directly supplied to the centering unit 212.

The centering unit 212 adds an input value (to be referred to as a centering amount hereinafter) to an output from the HPF 211 so as to return the correction amount to zero in the yaw or pitch direction of the image capturing apparatus 100. The processing by the centering unit 212 is performed when panning, or a large rotational shake which is too large to be corrected is generated. Note that the centering unit 212 is not essential in this embodiment, and an output from the HPF 211 may be directly supplied to the integrator 213.

The integrator 213 has a function capable of changing its characteristic in an arbitrary frequency band. The integrator 213 integrates an output from the centering unit 212, and supplies the result to the saturation prevention control unit 214. The saturation prevention control unit 214 controls to restrict an output from the integrator 213 to a value smaller than a predetermined value (to be referred to as a limit value hereinafter). When an output from the integrator 213 comes close to the limit value, the saturation prevention control unit 214 controls to, for example, change the cutoff frequency of the HPF 211 toward the high frequency side, shorten the time constant of the integrator 213, or increase the centering amount of the centering unit 212. These processes by the saturation prevention control unit 214 can cut off a motion component in a low frequency band that is generated by panning, and prevent a trouble in which a panning operation by a user is blocked. More specifically, the correction means (the image deformation unit 127 and a correction optical system 122) is configured to easily come to the center, thereby decreasing the degree of image stabilization against a shake to be detected (decreasing the tracking property of image stabilization). An output from the saturation prevention control unit 214 serves as a final translation correction amount and is supplied to an image deformation amount combining unit 205.

Blocks 220 to 224 used to calculate the correction amount of perspective image blurring will be described next. The blocks 220 to 224 execute the same processes as those of the blocks 211 to 214 except for processing by the perspective conversion unit 220. Only the perspective conversion unit 220 will thus be explained, and a description of the remaining blocks will be omitted.

Among outputs from the above-described interframe shake calculation unit 300, rotational shake data in the yaw or pitch direction is supplied to the perspective conversion unit 220. The perspective conversion unit 220 divides the rotational shake data by the focal length f calculated by the focal length calculation unit 204, and supplies the result to the HPF 221. Division by the focal length f is performed according to equations (25) and (26) for perspective. An output from the saturation prevention control unit 224 serves as a final perspective correction amount and is supplied to the image deformation amount combining unit 205.

Blocks 231 to 234 used to calculate the correction amount of rotational image blurring about the optical axis will be explained next.

Among outputs from the above-described interframe shake calculation unit 300, rotational shake data in the roll direction is supplied to the HPF 231. The HPF 231 has a function capable of changing its characteristic in an arbitrary frequency band. The HPF 231 outputs a signal in a high frequency band by cutting off low frequency components contained in the rotational shake data. Note that the HPF 231 is not essential in this embodiment, and an output from the interframe shake calculation unit 300 may be directly supplied to the centering unit 232.

When a rotational shake which is too large to be corrected is generated in the roll direction of the image capturing apparatus 100, the centering unit 232 adds a centering amount to an output from the HPF 231, similarly to the centering units 212 and 222. Note that the centering unit 232 is not essential in this embodiment, and an output from the HPF 231 or interframe shake calculation unit 300 may be directly supplied to the integrator 233.

The integrator 233 has a function capable of changing its characteristic in an arbitrary frequency band. The integrator 233 integrates an output from the centering unit 232, and supplies the result to the saturation prevention control unit 234. The saturation prevention control unit 234 controls to limit an output from the integrator 233 to a value smaller than a predetermined limit value. When an output from the integrator 233 comes close to the limit value, the saturation prevention control unit 234 controls to, for example, change the cutoff frequency of the HPF 231 toward the high frequency side, shorten the time constant of the integrator 233, or increase the centering amount of the centering unit 232. An output from the saturation prevention control unit 234 serves as a final rotation correction amount and is supplied to the image deformation amount combining unit 205.

The image deformation amount combining unit 205 performs calculation to combine the translation, perspective, and rotation correction amounts output from the saturation prevention control units 214, 224, and 234, respectively. More specifically, the projective transformation matrix in expression (1) is calculated according to equation (13). At this time, assume that the enlargement/reduction and shear deformation amounts have values represented by equations (27), (28), and (29), respectively. The image deformation amount combining unit 205 outputs the value of each element of the calculated projective transformation matrix to the image deformation unit 127. The image deformation unit 127 performs image stabilization by image deformation based on an output from the image deformation amount combining unit 205.

As described above, in the first embodiment of the present invention, the translation combining unit 203 is arranged, which adds at a predetermined ratio a motion vector, and a translation image blurring amount calculated from a rotational shake amount generated between frames. Translation image blurring is corrected based on the result. Hence, a calculation unit can be commonly used for a translation correction amount obtained from the angular velocity sensor and a translation correction amount obtained from a motion vector. Satisfactory image stabilization performance can be implemented by a simple arrangement.

The translation combining unit 203 is configured to change the ratio of addition depending on the reliability of a motion vector. When the reliability of a motion vector is low, the ratio of a translation image blurring amount obtained from the angular velocity sensor can be increased. Even in a shooting situation in which no motion vector is detected accurately, degradation of the image quality can be minimized.

Second Embodiment

Figure 8:
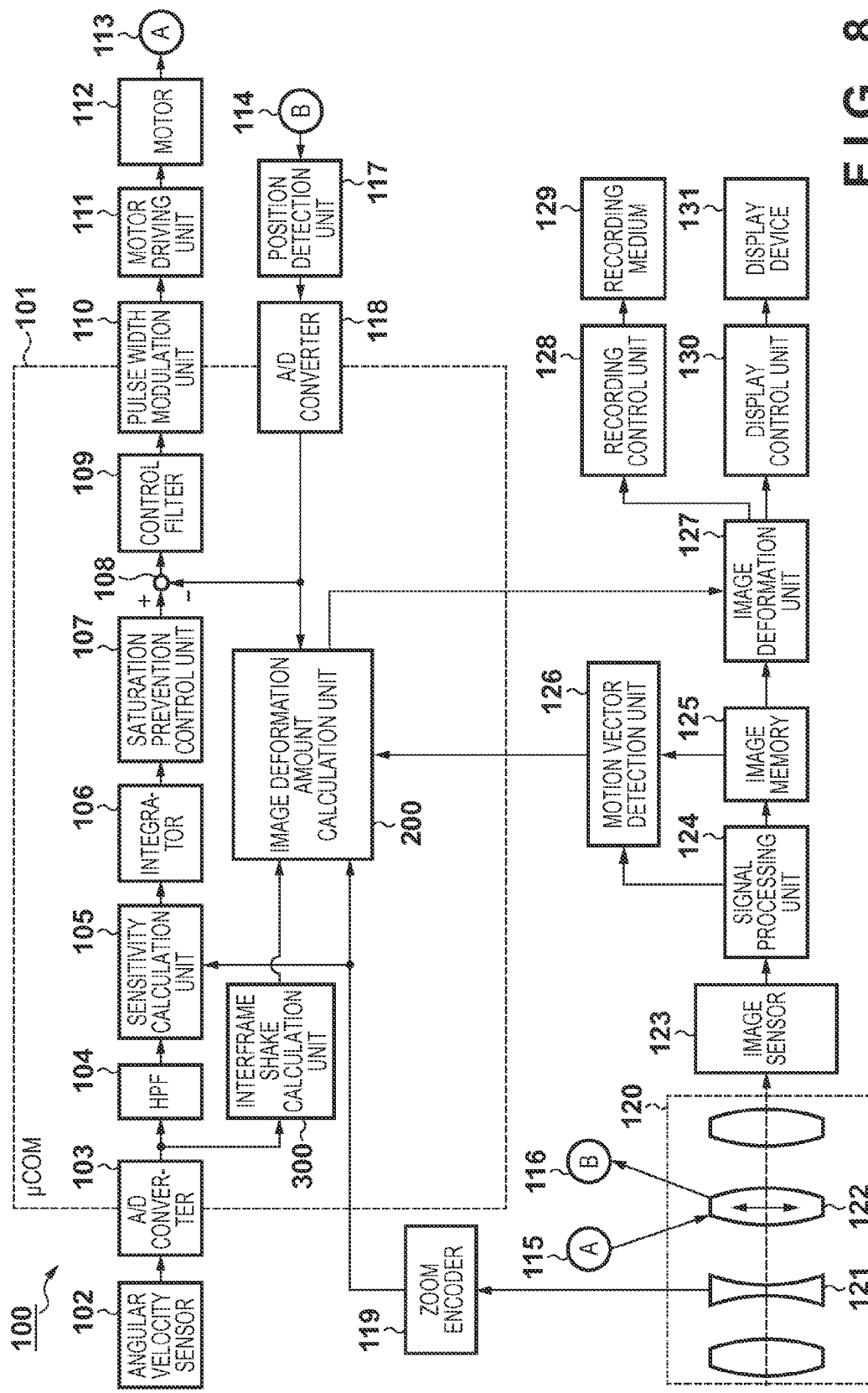
FIG. 8 is a block diagram showing an example of the arrangement of a video camera as an example of an image capturing apparatus according to the second embodiment of the present invention.

FIG. 8 is a block diagram showing the arrangement of a video camera as an example of an image capturing apparatus according to the second embodiment of the present invention. In FIG. 8, the same reference numerals as those in FIG. 1 denote the same parts and a description thereof will not be repeated. FIG. 8 shows an arrangement in which a correction optical system 122 configured to move in a direction perpendicular to the optical axis and optically correct image blurring of a captured image, and a block configured to control the correction optical system 122 are added to the arrangement of FIG. 1.

An output from an A/D converter 103 is supplied to an interframe shake calculation unit 300 and also to an HPF 104 in the arrangement of FIG. 8. The HPF 104 has a function capable of changing its characteristic in an arbitrary frequency band. The HPF 104 outputs a signal in a high frequency band by cutting off low frequency components contained in angular velocity data from the A/D converter 103. When a large rotational shake such as panning acts on an image capturing apparatus 100, the cutoff frequency of the HPF 104 is set to be a larger value than that for a small rotational shake.

In accordance with an output from a zoom encoder 119, a sensitivity calculation unit 105 calculates a coefficient used to calculate the optimum driving amount of the correction optical system 122 for each zoom position, multiplies an output from the HPF 104 by the coefficient, and supplies the result to an integrator 106. The integrator 106 has a function capable of changing its characteristic in an arbitrary frequency band. The integrator 106 integrates the output from the sensitivity calculation unit 105 and supplies the result to a saturation prevention control unit 107. When a large rotational shake such as panning acts on the image capturing apparatus 100, the time constant of the integrator 106 is set to be a value smaller than that for a small rotational shake.

When an output from the integrator 106 exceeds a predetermined limit value, the saturation prevention control unit 107 limits the output from the integrator 106 to be a value equal to or smaller than the limit value, and supplies the limited output to a subtracter 108.

A position detection unit 117 includes a magnet, and a Hall sensor provided at a position where it faces the magnet. The position detection unit 117 detects a moving amount of the correction optical system 122 in the direction perpendicular to the optical axis. An A/D converter 118 converts (A/D-converts) the position of the correction optical system 122 detected by the position detection unit 117 from an analog signal into a digital signal. The subtracter 108 subtracts the digital position data of the correction optical system 122 from an output from the saturation prevention control unit 107, and supplies the resultant deviation data to a control filter 109. A terminal B 114 and terminal B 116 indicate that they are electrically connected to each other.

The control filter 109 includes an amplifier which amplifies input data by a predetermined gain, and a phase compensation filter. After signal processing by the amplifier and phase compensation filter is performed in the control filter 109, the deviation data supplied from the subtracter 108 is output to a pulse width modulation unit 110.

The pulse width modulation unit 110 modulates the data supplied through the control filter 109 to a waveform (that is, PWM waveform) that changes the duty ratio of a pulse wave, and supplies the waveform to a motor driving unit 111. A motor 112 is a voice coil motor used to drive the correction optical system 122. When the motor driving unit 111 drives the motor 112, the correction optical system 122 moves in the direction perpendicular to the optical axis. A terminal A 113 and terminal A 115 indicate that they are electrically connected to each other.

These blocks constitute a feedback control system in which an output from the position detection unit 117 is subtracted from an output from the saturation prevention control unit 107, and the moving amount of the correction optical system 122 in the direction perpendicular to the optical axis is caused to follow the result. An output from the A/D converter 118 is supplied not only to the subtracter 108 but also to an image deformation amount calculation unit.

The correction optical system 122 is, for example, a shift lens and is an optical system capable of shake correction by moving the optical system in the direction perpendicular to the optical axis to deflect the optical axis. As a result of moving the correction optical system 122, translation image blurring of an object on the imaging plane, which is caused by a shake acting on the image capturing apparatus 100, is corrected. The corrected image is then formed on an image sensor 123.

Figure 9:
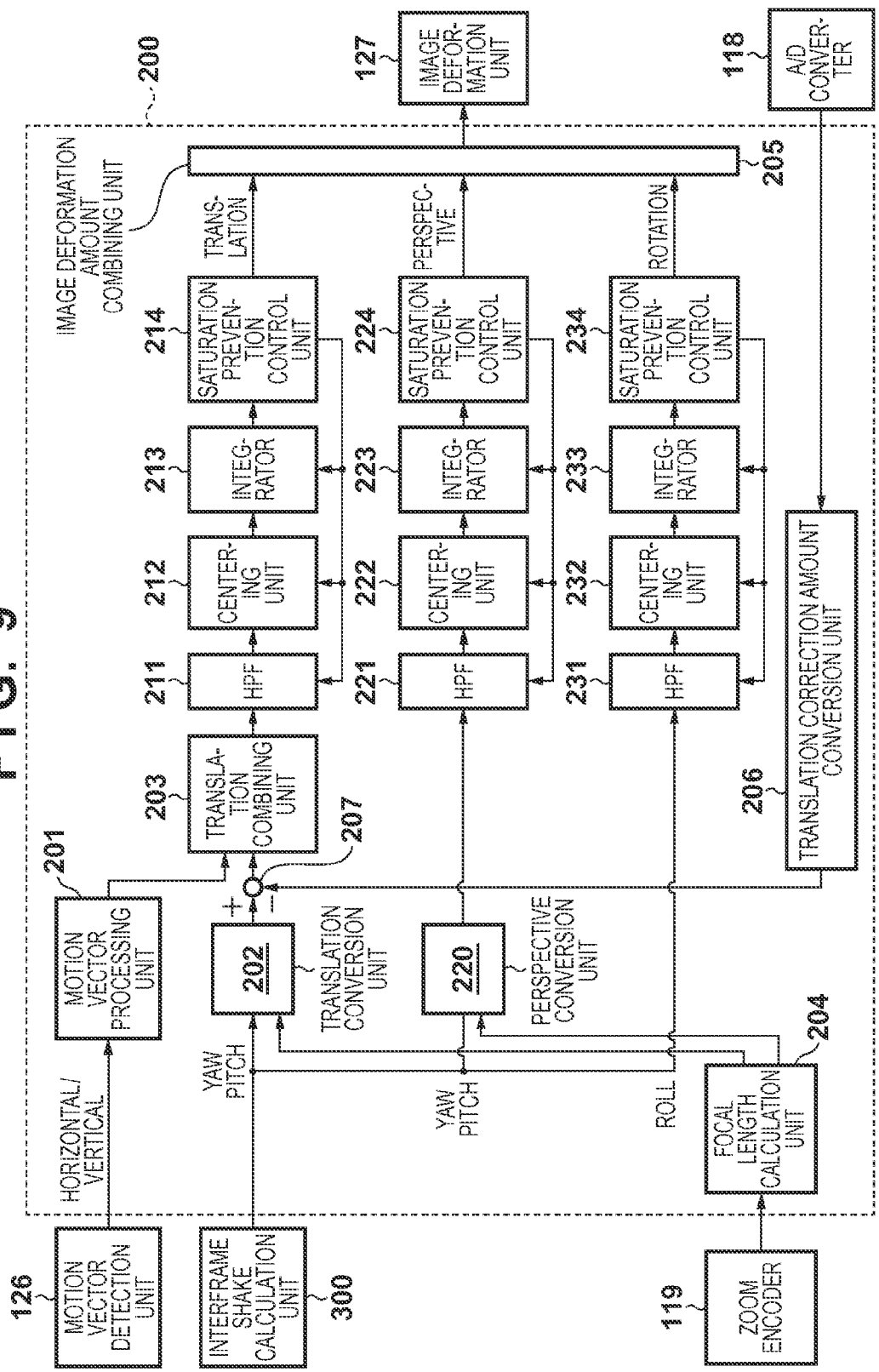
FIG. 9 is a block diagram showing the arrangement of an image deformation amount calculation unit in the second embodiment.

The building components of an image deformation amount calculation unit 200 and an example of its operation in this embodiment will be explained in detail below with reference to the block diagram of FIG. 9. In FIG. 9, the same reference numerals as those in FIG. 3 denote the same parts and a description thereof will not be repeated. In the arrangement of the image deformation amount calculation unit 200 in FIG. 9, a translation correction amount conversion unit 206 and subtracter 207 are added to the arrangement of FIG. 3.

By using an output from the A/D converter 118, the translation correction amount conversion unit 206 calculates a translation correction amount on the imaging plane upon correction by the correction optical system 122. Image stabilization by the correction optical system 122 can optically correct translation image blurring out of the respective deformation components of image blurring on the imaging plane. If the translation correction amount is calculated using all output data from the angular velocity sensor, as described with reference to FIG. 3, this results in over-correction. To prevent this, in the arrangement of FIG. 9, the translation correction amount conversion unit 206 calculates the translation correction amount of the correction optical system 122, and the subtracter 207 subtracts the translation correction amount of the correction optical system 122 from an output from a translation conversion unit 202. An image deformation unit 127 corrects only image blurs other than translation image blurring, and a translation correction amount which could not be corrected by the correction optical system 122.

As described above, in the second embodiment of the present invention, the correction optical system 122 optically corrects translation image blurring, in addition to the arrangement of the first embodiment. This can further decrease the number of extra pixels necessary for deformation in the translation direction, maintain the number of pixels which can be output from the image deformation unit 127 as many as possible, and minimizes degradation of the image quality.

In the second embodiment, the correction optical system 122 has been exemplified as an optical image stabilization means. The present invention, however, is not limited to this. For example, various kinds of image stabilization means such as a method of driving the image sensor 123 and a method using a prism can be used.

Third Embodiment

The second method of processing to be executed by a translation combining unit 203 in FIG. 3 will be described in detail below as the third embodiment. In the first embodiment, the ratio at which vector translation image blurring and sensor translation image blurring are added is changed depending on the reliability of a motion vector. However, the reliability of a motion vector can be analogized without directly evaluating a motion vector. For example, while a zoom operation is performed, local motion vectors calculated by a motion vector detection unit are detected radially from the center of the screen. A typical motion vector calculated using these local motion vectors may be considered to be less reliable. When the image capturing apparatus shoots an image while being greatly panned and tilted, the moving amount in an image between frames becomes large and sometimes exceeds the motion vector detection range. Even in this case, the reliability of the motion vector is considered to be low. The third embodiment will explain a method of changing, by using information other than a motion vector, the ratio at which vector translation image blurring and sensor translation image blurring are added.

The arrangement of an image capturing apparatus in this embodiment can be implemented by the same arrangement as those of FIGS. 1, 3, 5A, 5B, and 6. A control unit 241 in the translation combining unit 203 of FIG. 6 receives the reliability of a motion vector calculated by a motion vector processing unit 201, and also receives an output from an A/D converter 103 and an output from a zoom encoder 119. Based on these pieces of information, the control unit 241 changes the ratio at which vector translation image blurring and sensor translation image blurring are added.

Figure 10:
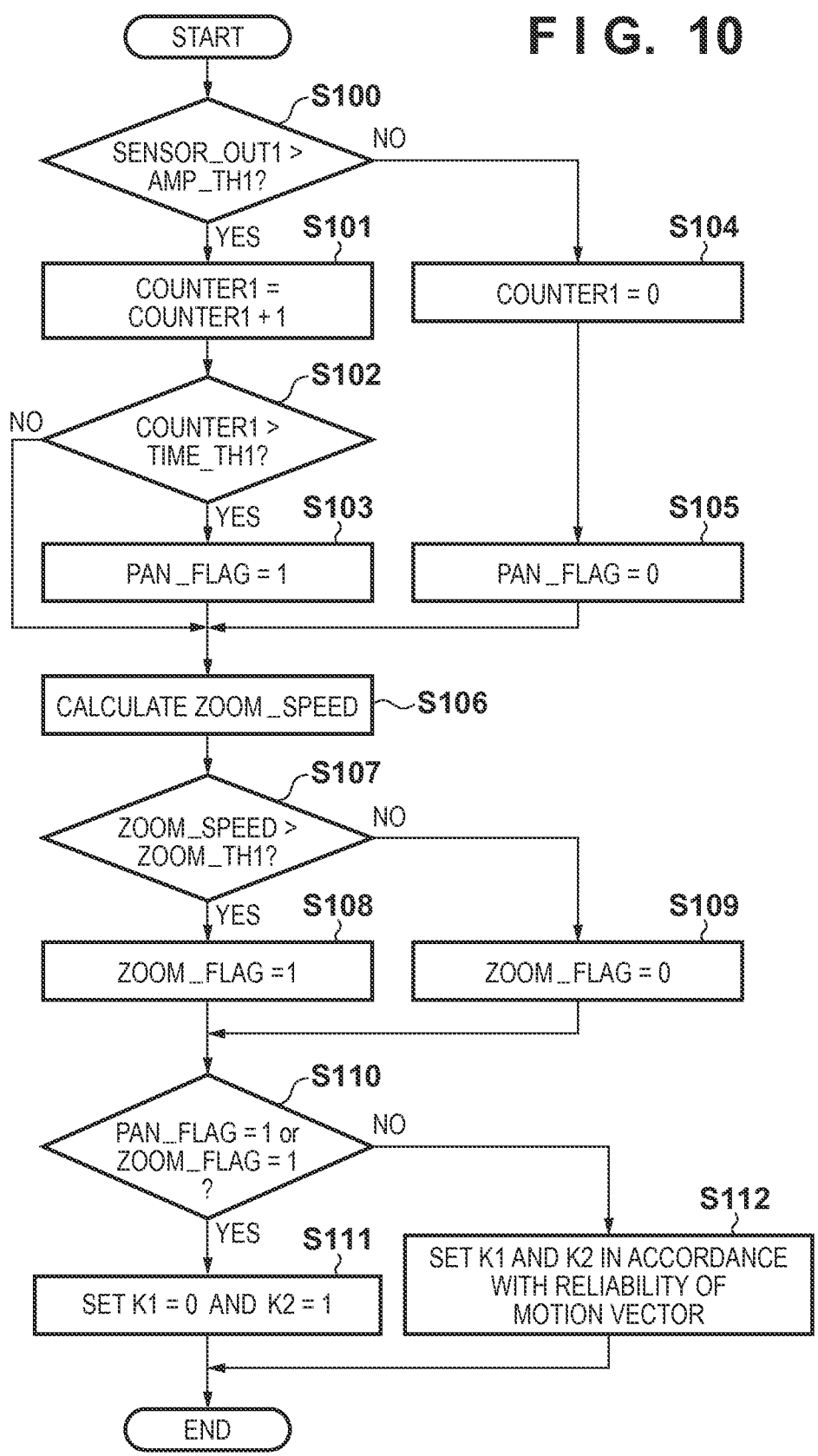
FIG. 10 is a flowchart for explaining the operation of a translation combining unit in the third embodiment of the present invention.

The flowchart of FIG. 10 shows an example of processing by the control unit 241. The processing in the flowchart of FIG. 10 is repetitively executed in a predetermined cycle of, for example, 60 Hz.

In step S100, a variable SENSOR_OUT1 is assumed to be a signal generated based on an output in the yaw or pitch direction from the A/D converter 103. Then, it is determined whether SENSOR_OUT1 is larger than a threshold AMP_TH1. The signal generated based on an output in the yaw or pitch direction from the A/D converter 103 is arbitrary as long as the signal is generated based on an output from the A/D converter 103. For example, this signal may be an output itself from the A/D converter 103, or a signal obtained by performing various filtering processes for an output from the A/D converter 103 or multiplying the output by a gain or the like. If it is determined in step S100 that SENSOR_OUT1 is larger than AMP_TH1, the process advances to processing in step S101.

In step S101, the value of a counter COUNTER1 is incremented, and then the process advances to processing in step S102. In step S102, it is determined whether the counter COUNTER1 is larger than a threshold TIME_TH1. If it is determined in step S102 that COUNTER1 is equal to or smaller than TIME_TH1, the process advances to step S106. If it is determined in step S102 that COUNTER1 is larger than TIME_TH1, the process advances to step S103 to write 1 in PAN_FLAG. The processing in step S103 is performed when a shake equal to or larger than the predetermined magnitude AMP_TH1 acts in the yaw or pitch direction for the predetermined time TIME_TH1 or more, that is, when the panning or tilting operation is performed for the image capturing apparatus 100 (panning state or tilting state).

If it is determined in step S100 that SENSOR_OUT1 is equal to or smaller than AMP_TH1, the process advances to processing in step S104. In step S104, the value of the counter COUNTER1 to be incremented in step S101 is cleared, and the process then advances to step S105. In step S105, PAN_FLAG is cleared, and the process advances to step S106.

In step S106, a change of the output value of the zoom encoder 119 from an output value in previous processing is obtained and stored in a variable ZOOM_SPEED, and then the process advances to step S107. In other words, in step S106, the change speed of the zoom ratio upon performing the zoom operation is obtained and stored. If it is determined in step S107 that ZOOM_SPEED is higher than ZOOM_TH1, the process advances to step S108. In step S108, 1 is written in ZOOM_FLAG, and then the process advances to step S110. If it is determined in step S107 that ZOOM_SPEED is equal to or lower than ZOOM_TH1, the process advances to step S109. In step S109, ZOOM_FLAG is cleared, and then the process advances to step S110.

In step S110, it is determined whether PAN_FLAG is 1 or ZOOM_FLAG is 1. That is, in step S110, it is determined whether the panning or tilting operation was performed for the image capturing apparatus 100, or the zoom operation was performed. If either PAN_FLAG or ZOOM_FLAG is 1, the process advances to step S111. In step S111, a magnification K1 of a multiplier 242 is set to be 0, and a magnification K2 of a multiplier 243 is set to be 1. This means that sensor translation image blurring data itself is used to calculate a correction amount without using vector translation image blurring data. If it is determined in step S110 that neither PAN_FLAG nor ZOOM_FLAG is 1, the process advances to step S112. In step S112, the magnifications of the multipliers 242 and 243 are set in accordance with the reliability of a motion vector calculated by the motion vector processing unit 201, and the processing in FIG. 10 ends. Note that the processing to be executed in step S112 is the same as that in the first embodiment, and a description thereof will not be repeated.

As described above, in the third embodiment of the present invention, the ratio at which vector translation image blurring and sensor translation image blurring are added in the translation combining unit 203 is changed depending on an output from the angular velocity sensor and an output from the zoom encoder, in addition to the reliability of a motion vector. When the panning or tilting operation or the zoom operation is performed, image stabilization is executed using translation image blurring data obtained from the angular velocity sensor. Therefore, even in a shooting situation in which no motion vector is detected accurately, degradation of the image quality can be minimized.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-286171, filed Dec. 27, 2012, which is hereby incorporated by reference herein in its entirety.

What is claimed is:

1. An image capturing apparatus comprising:
an image capturing unit to capture images;
a motion vector detection unit to detect a motion vector between two images out of the images;
a shake calculation unit to calculate a shake amount of the image capturing apparatus during shooting of the two images based on a shake detected by a shake detection unit and acquired in a period from an image capturing of a preceding frame out of the two images to an image capturing of a succeeding frame out of the two images;
an image blurring conversion unit to convert the calculated shake amount into an image blurring amount of an image;
a correction amount calculation unit to calculate, by using at least one of the detected motion vector and the image blurring amount, a correction amount; and
a correction unit to electronically correct image blurring of the image based on the correction amount.

2. The apparatus according to claim 1, wherein the correction amount calculation unit calculates correction amounts for correcting at least two image blurs including translation image blurring, perspective image blurring, and rotation image blurring about an optical axis in the image, and
wherein the correction amount for correcting the translation image blurring is calculated based on the detected motion vector and the image blurring amount, and the correction amount for correcting image blurring other than the translation image blurring is calculated based on the image blurring amount.

3. The apparatus according to claim 2, wherein the correction amount calculation unit calculates, based on a result of adding the detected motion vector and the image blurring amount at a predetermined ratio, the correction amount for correcting the translation image blurring.

4. The apparatus according to claim 3, wherein the correction amount calculation unit changes, depending on reliability of the motion vector detected by the motion vector detection unit, the predetermined ratio at which the detected motion vector and the image blurring amount are added, and when the reliability of the motion vector is low, decreases the predetermined ratio at which the detected motion vector is added, compared to a case in which the reliability of the detected motion vector is high.

5. The apparatus according to claim 3, wherein when the image capturing apparatus is determined to be in one of a panning state and a tilting state, the correction amount calculation unit decreases the ratio at which the detected motion vector is added, compared to a case in which the image capturing apparatus is determined to be neither the panning state nor the tilting state.

6. The apparatus according to claim 1, wherein the shake calculation unit includes an integration unit to integrate an output from the shake detection unit in a cycle shorter than a cycle in which the image capturing unit sequentially captures images, and
wherein the shake calculation unit calculates the shake amount of the image capturing apparatus between the two images by calculating a difference between an output from the integration unit when the image of the preceding frame out of the two images is captured, and an output from the integration unit when the image of the succeeding frame is captured.

7. The apparatus according to claim 1, wherein the shake calculation unit includes an integration unit to integrate an output from the shake detection unit in a cycle shorter than a cycle in which the image capturing unit sequentially captures images, and
wherein the shake calculation unit calculates the shake amount of the image capturing apparatus between the two images by acquiring an output from the integration unit when an image forming a moving image is captured, and resetting an integrated value of the integration unit.

8. A method of controlling an image capturing apparatus including an image capturing unit to capture images, comprising:
detecting a motion vector between two images out of the images;
calculating a shake amount of the image capturing apparatus between the two images based on a shake detected by a shake detection unit and acquiring in a period from an image capturing of a preceding frame out of the two images to an image capturing of a succeeding frame out of the images;
converting the calculated shake amount into an image blurring amount of an image;
calculating, by using at least one of the detected motion vector and the image blurring amount, a correction amount; and electronically correcting image blurring of the image based on the calculated correction amount.

9. A non-transitory computer-readable storage medium storing a program for causing a computer to execute a method of controlling an image capturing apparatus including an image capturing unit to capture images, comprising:
- detecting a motion vector between two images out of captured images;
- calculating a shake amount of the image capturing apparatus between the two images based on a shake detected by a shake detection unit and acquired in a period from an image capturing of a preceding frame out of the two images to an image capturing of a succeeding frame out of the two images;
- converting the calculated shake amount into an image blurring amount of an image;
- calculating, by using at least one of the detected motion vector and the image blurring amount, a correction amount; and
- electronically correcting image blurring of the image based on the calculated correction amount.

* * * * *